United States Patent
Talstra et al.

(10) Patent No.: US 11,445,219 B2
(45) Date of Patent: Sep. 13, 2022

(54) SYSTEM FOR HANDLING MULTIPLE HDR VIDEO FORMATS

(71) Applicant: KONINKLIJKE PHILIPS N.V., Eindhoven (NL)

(72) Inventors: Johan Cornelis Talstra, Eindhoven (NL); Nicoll Burleigh Shepherd, Surrey (GB); Leon Maria Van De Kerkhof, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 133 days.

(21) Appl. No.: 16/968,625

(22) PCT Filed: Feb. 5, 2019

(86) PCT No.: PCT/EP2019/052804
§ 371 (c)(1),
(2) Date: Aug. 10, 2020

(87) PCT Pub. No.: WO2019/158405
PCT Pub. Date: Aug. 22, 2019

(65) Prior Publication Data
US 2021/0051344 A1    Feb. 18, 2021

(30) Foreign Application Priority Data
Feb. 13, 2018    (EP) .................................... 18156435

(51) Int. Cl.
H04B 1/66    (2006.01)
H04N 7/12    (2006.01)
(Continued)

(52) U.S. Cl.
CPC .............. *H04N 19/70* (2014.11); *G09G 5/10* (2013.01); *H04N 19/124* (2014.11);
(Continued)

(58) Field of Classification Search
CPC .... H04N 19/70; H04N 19/124; H04N 19/172; H04N 19/46; G09G 5/10; G09G 2340/02; G09G 2370/04
See application file for complete search history.

(56) References Cited

U.S. PATENT DOCUMENTS 10,880,557 B2 * 12/2020 Dai ...................... H04N 19/186
2017/0026646 A1 * 1/2017 Minoo ................... H04N 19/46
2019/0208173 A1 * 7/2019 Kadu ....................... H04N 9/67

FOREIGN PATENT DOCUMENTS

WO    2016162095 A1    10/2016

OTHER PUBLICATIONS

Brondijk R et al: "Candidate Test Model for HEVC extension for HDR and WCG video coding", 113. MPEG Meeting; Oct. 19, 2015-Oct. 23, 2015; Geneva; (Motion Picture Expert Group or ISO/IEC JTC1/SC29/WG11),No. m37285, Oct. 18, 2015 (Oct. 18, 2015), XP030065653.
(Continued)

*Primary Examiner* — Fabio S Lima

(57) ABSTRACT

Because there are currently probably more than necessary different HDR video coding methods appearing, it is expected that practical communicated HDR videos may in several future scenarios consist of a complicated mix of differently encoded HDR video segments, which may be difficult to decode unless one has our presently presented video decoder (341) arranged to decode a high dynamic range video consisting of temporally successive images, in which the video is composed of successive time segments (S1, S2) consisting of a number of temporally successive images (I1, I2) which have pixel colors, which pixel colors in different time segments are defined by having lumas corresponding to pixel luminances according to different electro-optical transfer functions (EOTF), wherein the images in some of the segments are defined according to dynamically changeable electro-optical transfer functions
(Continued)

which are transmitted as a separate function for each temporally successive image, and wherein the images in other segments have lumas defined by a fixed electro-optical transfer function, of which the information is co-communicated in data packages (DRAM) which are transmitted less frequently than the image repetition rate, and wherein at least one of said data packages (DRAM) characterizing the electro-optical transfer function of the image pixel lumas after a moment of change (t1) between a first and a second segment is transmitted prior to the moment of change (t1); and similarly a corresponding encoder which composes the segmented video stream assuring that at least one correct package (DRAM) describing the EOTF according to which the lumas of a later video segment is coded is received by receivers before the change to a different HDR encoding method segment.

19 Claims, 5 Drawing Sheets

(51) Int. Cl.
| | |
|---|---|
| *H04N 11/02* | (2006.01) |
| *H04N 11/04* | (2006.01) |
| *H04N 19/70* | (2014.01) |
| *H04N 19/124* | (2014.01) |
| *H04N 19/172* | (2014.01) |
| *H04N 19/46* | (2014.01) |
| *G09G 5/10* | (2006.01) |

(52) U.S. Cl.
CPC ........... *H04N 19/172* (2014.11); *H04N 19/46* (2014.11); *G09G 2340/02* (2013.01); *G09G 2370/04* (2013.01)

(56) References Cited

OTHER PUBLICATIONS

Jer0en Stessen et al: "Chromaticity Based Color Signals for Wide Color Gamut and High Dynamic Range",ISO/IEC JTC1/SC29/WG11 MPEG2014/M35065, Oct. 1, 2014 (Oct. 1, 2014).
International Search Report and Written Opinion From PCT/EP2019/052804 dated Mar. 11, 2019.

* cited by examiner

SYSTEM FOR HANDLING MULTIPLE HDR VIDEO FORMATS

CROSS-REFERENCE TO PRIOR APPLICATIONS

This application is the U.S. National Phase application under 35 U.S.C. § 371 of International Application No. PCT/EP2019/052804, filed on Feb. 5, 2019, which claims the benefit of EP Patent Application No. EP 8156435.2, filed on Feb. 13, 2018. These applications are hereby incorporated by reference herein.

FIELD OF THE INVENTION

The invention relates to methods and apparatuses for handling and in particular decoding changes in time of the coding of a video image's dynamic range or high dynamic range (HDR) coding method.

BACKGROUND OF THE INVENTION

Until a couple of years ago, all videos (e.g. television programs or movies on blu-ray disks, or other uses of video such as e.g. videophony) and most still images were encoded according to the so-called low dynamic range (LDR) philosophy, also called standard dynamic range (SDR). This meant there was a single manner to create images, with the Rec. 709 OETF defining the 8 or 10 bit luma codes of the YCbCr image pixel color for transmission, and the coding peak brightness (PB_C), i.e. the luminance of the brightest white pixel that could be coded, of the video was standard always 100 nit, and the darkest codeable luminance 0.1 nit. All actual displays at end consumer's premises, as well as the preview monitors at the site of content creation had corresponding whitest white (PB_D=100 nit) and darkest black, so that made video production and handling further down the technical chain relatively simple, as the producer would see on his identical production monitor what the end customer would see.

Recently the past few years, new displays with considerably different PB_D have emerged, e.g. a 2000 nit PB_D display which is no less than 20 times brighter than the SDR display, and that could mean that images would look annoyingly bright (when e.g. mapping a SDR image straight onto a HDR display under the constraint of relative luminance displaying with coded white mapped to display PB_D), or vice versa a HDR image (supposedly made for a HDR TV) could look far too dark when directly rendered on a HDR TV, i.e. without the TV doing some (non-standard) optimization on the image to make it better viewable.

Things complicated by the introduction the last 4 years of a number of different HDR image coding and handling systems.

For convenience the reader is introduced to some of the basic aspects of HDR coding and dynamic range adaptation with the aid of FIG. 1, which shows a couple of archetypical illustrative examples of the many possible HDR scenes a HDR system of the future (e.g. connected to a 1000 nit PB_D display) may need to be able to correctly handle, i.e. by rendering the appropriate luminances for all objects/pixels in the image. HDR images may have many normal colors of normal luminance (i.e. which can also be coded in SDR, like a well-lit human face), but typically they may have at least one of ultra-dark and ultra-bright pixel regions.

E.g. ImSCN1 is a sunny outdoors image from a western movie (which has mostly bright areas (the landscape), which should ideally be rendered somewhat brighter than on a 100 nit display, to offer more a sunny look than a rainy day look), whereas ImSCN2 is a nighttime image (with mostly dark pixels, yet within the same image also very bright pixels, e.g. the streetlight lamp pixels).

What makes HDR image rendering different from how it always was in the SDR-only era which ended only a couple of years ago, is that the SDR had such a limited dynamic range (PB_C=100 nit, and displayable black level approximately 0.1 to 1 nit), that mostly only the intrinsic reflectivities of the objects could be shown in SDR (which would fall between 90% for good white and 1% for good black). That would be good for recognizing objects (having a certain amount of brightness from their reflection, and of course their chromaticity), under uniform technically controlled illumination, but not so much the beautiful variations in illumination itself one can have in natural scenes, and what impact that can have on viewers.

In HDR one can at least define to be displayed luminances which may fall e.g. between $\frac{1}{10000}$ and 10,000 nit. An interesting secondary question is then how such luminances as defined in the received image, i.e. luminances as they should ideally be displayed, must be displayed on any display with a lower display peak brightness PB_D than the needed e.g. 5000 nit for rendering the sun as the creating side ideally intended the sun to be (and preferably a corresponding lower displayed luminance for the sun on say a 750 nit PB_D display, should be so determined that although the look of the image is not the perfect one, the 750 nit PB_C image when displayed at least conveys as much as possible the original master 5000 nit PB_C HDR image, at least with the correct pixel chromaticities).

Several HDR codecs define in addition to the master HDR image, a corresponding SDR image (i.e. with optimally defined look, meaning that the image pixel colors are as similar to the HDR image pixel colors visually as the more limited SDR color gamut allows); and some codecs also define a manner to derive optimally looking so-called Medium Dynamic Range images, for supply to displays with a PB_D in between the master HDR image's PB_D (e.g. 5000 or 10,000 nit) and the SDR's 100 nit PB_C (or to derive images for a PB_D which is even higher than the master image's PB_C). This is typically done by co-communicating in metadata at least a luminance mapping function (FIG. 2, F_L; and possibly also a color mapping specification F_C for e.g. changing the saturation of the SDR pixel colors derived from the corresponding HDR pixel colors at the same spatial position), prescribing how a pixel luminance in the HDR image should be transformed into some corresponding SDR pixel luminance (or in some codecs a transformation to some MDR pixel luminance, there not necessarily being a mapping to SDR).

On the left we see the luminance axis for a 5000 nit PB_C master HDR image coding (and corresponding dynamic range DR_h, which can be defined as the brightest luminance divided by the darkest, although the reader should realize that good dynamic range imaging is not just about those two endpoints, but also about the optimal determination for each HDR scene type of all in-between pixel luminances for the various HDR scene objects). On the right we see the corresponding pixel luminances for typical image objects along the SDR luminance dynamic range DR_s.

It can be seen that sometimes the luminance mapping rule is "keep the luminance the same", and sometimes the HDR luminance needs to dimmed, to compress the larger range of HDR luminances in the smaller range of SDR luminances. And similarly a mechanism can derive a secondary luminance mapping function to map e.g. received SDR images or received HDR images to e.g. 750 or 1500 nit MDR images (also called display adaptation). As will be detailed below, HDR image handling is not only complex because there are many different kinds of display with different kinds of PB_D with a desire that each viewer gets an optimal or at least reasonable presentation on his particular display of the original HDR artistic creation video, and that there are many different kinds of HDR scene one can construct, which have different HDR effects and luminance distributions which need different optimizations before display, but now also that there have been developed different technical coding manners for HDR video, which have different EOTFs, and need to be correctly decoded and coordinated, especially when temporarily interspersed.

FIG. 2 schematically shows the high-level overview of a HDR image coding and decoding chain, in particular according to applicant's HDR paradigm.

All such HDR video coders have the property (which was seen as a necessary requirement to be fulfilled to enable quick market adoption given the vast amount of already deployed video handling technology from the SDR era) that a HDR image can actually be communicated "as if it was a normal SDR image", i.e. e.g. via HEVC or similar video compression.

The "as if" is of course a complexity that can become problematic, and below invention and its embodiments are also an example of a quite annoying problem which pops up in practice (in this system which was not deployed 100% anew from scratch, but built on existing limitations).

The simplest codec is the HDR10 codec. It generates the lumas Y of the pixel colors by using a new opto-electrical transfer function (OETF) which is much steeper than the Rec. 709 OETF, and therefore able to code a larger range of input image luminances. But for video compressor 203 these are just lumas, it doesn't care (only the decoder needs to have the correct inverse of the OETF, the so-called EOTF, to be able to reconstruct the correct HDR pixel luminances). Note that for keeping the understanding simple the EOTF is this text is not necessarily solely the function shape relationship between normalized lumas and luminances, but may also take into account a coding peak brightness PB_C of the luminances.

Other video codecs transmit the HDR image actually as a corresponding SDR image (backwards compatible with legacy decoders, for users such as a broadcaster which find the SDR image look more important than or as important as the HDR image look), and the decoder has a way to transform the received SDR luminances back to a close reconstruction of the master HDR image created at the creation side. An example of such a codec is the Hybrid LogGamma (HLG) codec, which uses a fixed function for the transformation (with disadvantages such as color errors, but for the present application that is not so relevant) and hence need not send metadata, at least theoretically.

Below we describe the generic principle with an example which uses so-called dynamic metadata, which means that different optimally shaped luminance mapping functions F_L can be communicated for each temporally successive image (but it is important to understand that not all coding philosophies have defined such dynamic metadata, so it will not always be communicated).

FIG. 2 will be elucidated with a typical system of the SDR-communicating type, e.g. applicant's SL_HDR1 codec (ETSI TS 103 433-1 v 1.2.1 (August 2017)). The color mapping functions F_ct, being at least one luminance mapping function F_L and potentially also F_C (although some systems may define a well working F_C corresponding with the communicated F_L at the receiving side) may be defined by a human color grader (or alternatively automatic image analyzing software), to get a reasonably looking SDR image (Im_LDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR). The IF_ct functions can be determined from the forward, HDR-to-SDR mapping F_ct functions as communicated, or, the system may even directly communicate the IF_ct function(s).

The color transformer 202 typically applies the F_ct luminance mapping of the relative luminances of the master HDR image (MAST_HDR) pixels, i.e. normalized so that the maximum luminance is 1.0. For understanding the present invention's concepts in a simple manner, one may for simplicity assume it uses a $4^{th}$ power luminance mapping function (L_out_SDR=power(L_in_HDR; ¼)) for deriving the normalized SDR output luminances of the pixels of the 100 nit PB_C SDR output image Im_LDR (i.e. the right side of FIG. 1), i.e. that such a function gives a reasonable look for the SDR graded corresponding images to the master HDR image of the scene (reasonable meaning for the particular scene such aspects like e.g. that a large percentage of the shadowy areas will not look too dark, lamps and other luminous objects will pop as desired by virtue of them having still a reasonable inter-region contrast with the darker image regions even in the SDR image, at least as far as the SDR luminance dynamic range allows, etc.; for other images other factors may contribute, but such details are not essential nor limiting for elucidating the technical components of the present invention). Obviously the luminance mapping functions can in general be more complex, but such details are not needed for understanding the present application's techniques.

Since the receivers must be able to reconstruct the master HDR image from the received corresponding SDR image, or at least a close reconstruction but for some compression-related artefacts, apart from the actual pixelated images also the color mapping functions F_ct must enter the video encoder 203. Without limitation, we may assume that the video is compressed with a MPEG HEVC video compressor (or similarly AVS, etc.), and the functions are stored in metadata, e.g. by means of the SEI mechanism or a similar technique.

So after the action of the content creating apparatus 221, from the image communication technology perspective, the video compressor 203 pretends it gets a normal SDR image as input, and more importantly: outputs what is technically a SDR image, decodable with the Rec. 709 standard SDR luma specification. So then the further technology, e.g. a transmission formatter 204 applying all the necessary transformations to format the data to go over some transmission medium 205 (e.g. coding to store on a BD disk, or frequency coding for cable transmission, etc.) can just apply all the typical steps it used to perform in the SDR coding paradigm.

Subsequently the image data travel over some transmission medium 205, e.g. a satellite or cable or internet transmission, e.g. according to ATSC 3.0, or DVB, or whatever video signal communication principle, to one or more receiving side(s).

At any consumer or professional side, a receiver 206, which may be incorporated in various physical apparatuses like e.g. a settopbox, television or computer, undoes the channel encoding by applying unformatting and channel decoding. Then a video decompressor 207 applies e.g. HEVC decoding, to yield a decoded SDR image Im_RLDR, and the color transformation function metadata F_ct. Then a color transformer 208 is arranged to transform the SDR image to an image of any non-SDR dynamic range. E.g. the 5000 nit original master image Im_RHDR may be reconstructed by applying the inverse color transformations IF_ct of the color transformations F_ct used at the encoding side to make the Im_LDR from the MAST_HDR. Or, a display adaptation unit 209 may be comprised which transforms the SDR image Im_RLDR to a different dynamic range, e.g. Im3000n (in this example having a PB_C=3000 nit, but in general any PB_C lower or higher than the PB_C of the input image, typically at least by a difference of 10%) being optimally graded in case a connected display 210 is a 3000 nit PB_D display, etc. We have non-limitingly assumed the video decoder and color transformer to be in a single video re-determination apparatus 220. Although we assumed in this example that the decoder was at a video usage endpoint, connected to a display for viewing the content (e.g. a HDR television, or a portable display etc.), the same principles can be comprised in e.g. a transcoder, where the receiver resides at an in-between point of the video handling chain, e.g. at a redistribution station of a cable operator, or instead of displaying on a display the output video can be stored on a non-volatile memory, etc.

If all systems in the world would communicate such a dynamically changing luminance mapping function F_L for each image, there would not be a problem, even if the coding of the images changes, and e.g. a receiving display would be able to do display adaptation of a communicated image having information of pixel luminances of up to e.g. 5000 nit, to an optimal image corresponding to the display to be supplied with HDR images whatever its PB_D is (PB_C of the optimal image is equal to the particular PB_D, but also all lower luminances are appropriately mapped depending on which object configuration is actually in the image).

However, the problem is that, as said, not all coded video has associated dynamic luminance mapping functions (e.g. HDR10 encoded—and potentially re-decoded—images per se have only a fixed electro-optical transfer function defining its lumas for corresponding to be displayed luminances; or SDR video images were defined according to a sole EOTF because all of the present issues were not imagined at that time), and hence we can expect that some content providers (e.g. broadcasters, or an in-between content supply apparatus), may communicate some of the images at certain points in time without the dynamic metadata (i.e. no corresponding F_L function for the respective images). The receiver will then not know what to do when it needs to decide how to correctly display the successive images, and e.g. a bright glitch may occur, or some regions of the image may become invisibly dark, etc., if the decoder is set to the incorrect luma interpretation mode.

WO2016/162095 teaches that a HDR input image (as captured by a camera sensor) can be encoded into a final image by applying one of several possible OETF functions to define the luma codes of the final image. E.g. the value gamma of a power function can be selected depending on what pixel content (luminances or RGB values) are exactly in the input image, e.g. if it has a large dynamic range because it contains deep blacks as well as bright pixels. Those deep black pixels can be quantized more accurately, i.e. more visually perfect for the human visual system, if a gamma function with a higher slope for the darker luminances is used (e.g. ¼ instead of ½). Where this document teaches the possibility to select an optimal OETF for each (separate) video, which specific OETF must then be communicated as metadata, indicating which variant was selected by the encoder, it doesn't teach changing the OETF within a same video as encoded, or potentially received.

US2017/0026646 teaches about optimal non-linear quantization realized via optimally variable OETFs. Apart from some pre-processing color mappings, the core of this teaching is encoded transfer function 208 and where applicable also 210.

Suppose 210 applies a fixed OETF, e.g. SMPTE 2084. Such a fixed OETF is largely good for any HDR video, but it could be even improved by a preprocessing when one knows that only some specific luminances are present in a particular part of a input master video to be encoded. E.g., assume that the shot between 10 min. 40 sec and 12 min. 20 sec. is a brightly lit planet with seven suns, which has all pixel luminances in the upper part of the total luminance range (e.g. 100-10,000 nit). Knowing that the fixed 2084 OETF has relatively fewer quantized codes for the bright end of the range, transfer function 208 could do a premapping of the luminances spreading them over a larger subrange, more into the darker luminances, so that more of the luma codes are ultimately used for the pixels that do exist, giving a higher precision. If only the input HDR image, when reconstructed by doing all of these processings inverted, is used for displaying, nothing of happens in between matters very much for the brightness look of the end result, except for HEVC encoding quality.

Whereas this document teaches that arbitrarily varied pre-mappings may occur in transfer function unit 208 (and hence a per image or set of images variable OETF), there is no teaching of a more variable coding scenario, in particular in which there are situations of OETFs which are not variable, i.e. static, i.e. of a couple of fixed, simple, pre-agreed types, like e.g. the HLG function. Furthermore there is no teaching that there may be time instants of images for which this static OETF definition is even missing, leaving (no matter how simple the inversion of a static OETF may be) the decoder unaware about how to reconstruct pixel luminances for the received lumas.

On the contrary, if there is a teaching of (always) variable OETFs, and especially parts of OETFs, the skilled person would always reasonably believe that such needed highly variable information must be communicated everywhere it changes, i.e. at least per image time instant (unless it is valid for the next N images of a shot of images, which is equivalent to indeed communicating the correct OETF for all those images). As the problem of missing OETFs is not identified in US2017/0026646, there is also nothing mentioned which can form a starting inspiration towards the solution.

SUMMARY OF THE INVENTION

This problem is handled by a video decoder (341) arranged to decode a high dynamic range video consisting of temporally successive images, in which the video is composed of successive time segments (S1, S2) consisting of a number of temporally successive images (I1, I2) which have pixel colors, which pixel colors in different time segments are defined by having lumas corresponding to pixel luminances according to different electro-optical transfer functions, wherein the images in some of the segments are defined according to dynamically changeable electro-optical transfer functions which are transmitted as a separate function for each temporally successive image, and wherein the images in other segments have lumas defined by a fixed electro-optical transfer function, of which the information is co-communicated in data packages (DRAM) which are transmitted less frequently than the image repetition rate, and wherein at least one of said data packages (DRAM) characterizing the electro-optical transfer function of the image pixel lumas after a moment of change (t1) between a first and a second segment is transmitted prior to the moment of change (t1), and wherein the video decoder (341) has a memory (343) and is arranged to store in that memory a data package (DRAM) of said data packages received at a moment in time earlier by a number (N) of picture repetition times than the moment of change (t1).

So the video decoder is arranged to be able to handle such complex, differently defined HDR video, and by the following aspects.

Firstly for the reader's convenience the concept of an EOTF is defined, because recently in the HDR video era it became more complex than the classical SDR EOTF.

Basically EOTF means that "electrical" codes (originally voltages in analog television, but now in digital video typically M bit codes, where M is typically 10 or more; and the codes can be various color codes like 3×10 R, G, and B lumas, or YCbCr color coding) are by a functional calculation mappable to optical codes, namely the luminances to be displayed, ergo:

$L=EOTF(Y')$, with L the luminance as defined in CIE colorimetry, and Y' the luma code.

The inverse is called the opto-electrical transfer function, and it maps the original optical value, e.g. as measured by a camera, to a 10 bit luma code number.

$Y'=OETF(L)$.

In SDR, there was only one sole EOTF, defining the SDR television system, which was defined because CRT electron guns irradiating phosphors have approximately a power_2 transformation behavior when converting an input voltage to an output luminance as displayed on the TV screen.

To be precise, the Rec. 709 (SDR) OETF was standardized as (when the input luminance is normalized to [0.0-1.0]):

$$Y'=IF(L<0.018; 4.5*L; \text{else } 1.099\text{power}(L;0.45)-0.099) \quad [\text{Eq. 1}]$$

However, it can be shown by calculating the luminances corresponding to 0-1023 luma codes that this OETF can only encode a dynamic range of 1000:1, or more precisely LDR luminances between 0.1 nit and 100 nit (which does suffice for getting reasonably looking images when uniformly illuminated, but not spectacular HDR images with e.g. ultra-bright light sabers in dark caves, for which one would like the content creator to specify as new luma codes Y'* luminances between 1/10,000 and 10,000 nit, which is although not covering all luminances occurring in nature seen as sufficient for defining images to be seen on displays).

So one started to define at least one new HDR EOTF, which was the Perceptual Quantizer EOTF, standardized as SMPTE ST.2084:

$$Y'^{*}=POWER((C1+C2*POWER(L;A))/(1+C3*POWER(L;A));B) \quad [\text{Eq.2}],$$

with the following constants: C1=0,8359375; C2=18, 8515625; C3=18,6875; A=0,1593017578125; B=78,84375.

For good reasons more kinds of HDR EOTF emerged, but even if having a video comprising of segments of only SDR interleaved with PQ-defined (static) HDR one can have the following problem.

As said above, for the HEVC compressor the input are pixels with a luma Y being a 10 bit number, whether the luma was an SDR luma Y' calculated according to Eq. 1, or a HDR luma Y'* calculated according to Eq. 2. However, the decoder seeing the same luma code, e.g. 721, must use the correct decoding EOTF for each respective different image coding, because although the luma code for the two different scenarios may be the same, a different ultimately to be displayed luminance should be calculated by the decoder by applying the appropriate EOTF (in fact, since the PQ EOTF can yield far brighter or darker luminances, e.g. inappropriately applying the PQ EOTF on a luma which was encoded according to the Rec. 709 OETF—and hence to be decoded with the Rec. 709 EOTF—can yield a decoded luminance which may be more than 10× to bright or too dark, even for these fixed two EOTF possibilities only).

It should be noted shortly that there also various manners to define the HDR pixel colors, e.g. Hybrid LogGamma (HLG) uses the OETF on the three RGB color components separately, i.e. yielding e.g. a red luma R'**=OETF_HLG (R), with R being the linear amount of red in the RGB color definition (the percentage of red photons in approximate layman's terms). But for simplicity of elucidation of this invention's concepts we assume in below explanation that the pixel colors are defined in the classical Y'CbCr video color encoding, be it that the Y' may be defined by many other OETFs than the standard Rec. 709 OETF it was originally defined with (and similarly for the corresponding chrominances Cb and Cr).

It is important for the reader to understand that the more advanced (higher quality, future proof) HDR video codecs like applicant's SL-HDR1 (ETSI TS 103 433-1 v 1.2.1 (August 2017)) and SL_HDR2 (ETSI TS 103 433-2) have a relationship between the communicated lumas and the ultimately to be displayed luminances which is defined by variable functions, i.e. which shape can be changed depending on the particular of a HDR image, which is a considerable big step compared to the fixed SDR or HDR10 coding (and such a mapping can be formulated according to the old naming as a variable EOTF). To be sure the new paradigm's intricacies are understood by the reader, FIG. 4 gives an example.

Suppose the input HDR image is a somewhat more complex (but not very atypical, and in any case when occurring to be correctly handled by any HDR coding or handling technology) HDR scene image, consisting of averagely illuminated areas between a dark cave region, and a bright sunlit outside region and another bright region Rsm). This is how in general a HDR scene image can be constructed, whether it is some found environment captured under the local available lighting situation, or a beautiful artistically generated image (perhaps CGI). There are several criteria for the mapping to the considerably lower SDR luminance range, e.g. with the luminance mapping function F_L(t1) optimal for this particular image time moment (t1) being specified by a human color grader at the content creation site. The mapping is shown using standard luminances, because the reader can imagine how such luminances would correspond to e.g. PQ lumas on the horizontal axis, and Rec. 709 lumas for the vertical SDR luminance axis (which would correspond to a non-linear stretching on the axis, and corresponding deformation of the luminance mapping shape, but the point of the need for constructing a variable EOTF stays the same as exemplified herebelow). E.g. the darkest image region Rd has a man with knife slightly visible hidden in the shadows. In the HDR image encoding (with its luminances shown on the horizontal axis of the bottom luminance mapping graph) one has encoded the luminances according to the reasonable assumption that a good HDR display system will be able to visually optimally show this man with luminances e.g. between 0.01 and 0.1 nit (note that 0.1 nit is already the minimum of the SDR luminance range, so one should not map according to identity of the luminances in SDR and HDR). To make this man correctly visible on the SDR luminance range, i.e. not too plainly visible, but not totally black either, one must allocate to the HDR sub-range of luminances HD an SDR luminance sub-range RD optimally between 0.5 and 1 nit in this example, so that already defines that part of the dynamically variable per image luminance mapping function (or correspondingly EOTF). The person lying in the averagely lit region Rwo of the image, must be mapped to nicely contrasty, bright and colorful colors of the SDR range, i.e. which would typically lie around 50 nit (even in the SDR image we would like e.g. the contrast of the eyes to be good both on the more and the lesser illuminated side of the face). In fact, if this were simply a SDR production, one might give the face of that person a luminance of e.g. 60 nit and the white shirt of that person a luminance of 90 nit, but all the much brighter HDR luminances would have only 10 nits of the SDR range left to correctly display everything which is impossible (and typically there would be clipping to maximum white—luma 1023 or luminance 100—e.g. of the sunny outside region Ros, hence the trees and shrubbery would not be visible in a uniform white areas, let alone that there would be a nicely bright yellowish sun). Ergo, if we want to show somewhat of the brighter HDR image regions still reasonably in the SDR image, we must lower the uppermost luminance of the range RW to e.g. 50 nit maximally (depending on whether the nice colorfulness of that lying person has more or less preference over the colorfulness of the brighter regions of the image). The problems of the bright regions can become quite challenging (needing particular carefulness about the partial shape of the F_L(t1) curve shape for that sub-range), as illustrated by bright region Rsm. This part of the cave is in a very bright mist, so the man may show as a slightly visible low contrast kind of shadow modulating the bright white (a "shadowman"). Obviously, we must tune that part of the curve so that also in the SDR there is more than 2% difference between the darker pixels of the man's body and the surrounding mist whites, because that is the just noticeable difference. If however one has a static curve OOTF_fix, one can see that the mapping in the darkest sub-range RD may lead to SDR images in which the man with the knife is too visible, whereas the slope of the upper part of the curve for sub-range HS is too low, so that the shadowman becomes invisible. Ergo, HDR image luminance re-grading can sometimes be not too difficult, but sometimes be quite challenging, and the solution capable of handling all possible situations with good quality are dynamically adjustable luminance mapping functions (but this could entail the risk that a quite excessive mapping is applied to an image with cannot support that, although as we will show below there need not be a problem).

What we show in the graph of FIG. 4 is actually an opto-optical transfer function, but the reader can imagine how it could be converted to a corresponding electro-optical transfer function: the L_SDR luminances can be converted to standard SDR lumas according to the Rec. 709 OETF. If one then applies the curve F_L(t1) to pixel brightness values with e.g. according to SL_HDR1 were originally communicated as lumas in the HEVC decompressed SDR image, to obtain the reconstructed HDR luminances, one has defined the equivalent electro-optical transfer function between the input SDR luma codes and output HDR optical luminances (actually our preferred color processing also does conversion via a perceptually uniformized luma, but those details are not important for this invention, since the end effect is a variable EOTF).

Also in the SL_HDR2 variant, there is an equivalent EOTF, which converts initial e.g. PQ defined lumas to the ultimate output being display adapted luminances to be displayed on the MDR display, and that is similarly an example of a variable EOTF.

Working with only dynamic luminance mapping functions, creates no major problem in principle: one may still have issues in harmonizing the luminances of the two videos if they were e.g. differently lit, but at least one can decode the two sequences of images correctly to some reference representation, e.g. the PB_C_x and PB_C_y reconstructed HDR). That is because each image will have its dynamic metadata packet 313 associated containing e.g. the dynamic luminance mapping function F_L(t00) information (e.g. as parameters defining the shape of the function in some of the ETSI SL_HDR1 or SL_HDR2 embodiments, or a LUT of the function in other embodiments) for image time moment t00.

However, static codings of HDR (or SDR) with fixed function need to send their information only irregularly, a few times per video total segment length only, because it is a fixed function, ergo the information is needlessly multiplied.

So for some codec systems, e.g. a pure HDR10 based (static PQ-defined lumas) HDR video communication system yielding such HDR video interspersed with SDR (Rec 709 OETF-defined) video (or with other static HDR video coded according to another static OETF than the PQ function), there is an unsolvable problem: bad decoding of at least some frames of the second video segment after the change of segment (t1, or t2, etc.), which leads to (potentially severe) visual glitches, e.g. in the average brightness of the images before and after the change time (also in SDR a scene change can occur, e.g. if the content creator doesn't create a nice transition between e.g. the action in the dark cave and a bright outdoors scene or vice versa, but now on a e.g. 2000 nit television this could become quite annoying for the viewer, because the cave can be much darker than 1 nit on average, and the bright region several 10 s of times brighter than 100 nit).

However, a system having dynamic metadata can solve the decoding problem elegantly. So the dynamic metadata packets will contain all information to apply the variable luminance mapping, for each image, ergo, each image can be correctly decoded (or potentially further or differently processed if that is the alternative objective of the receiving device, e.g. harmonized to a particular reference situation, which may require different, locally optimized luminance mapping functions, but the input data meaning of the lumas must in any case be unambiguously clear, so such secondary locally optimized harmonization luminance mapping functions are typically determined based on the co-communicated dynamically varying luminance mapping functions which map to the decoder reference HDR image, i.e. e.g. from received SDR lumas to HDR luminances on a 5000 nit PB_C reference luminance range). Ergo, if there is a change between statically determined HDR (like HDR10) or SDR before the change time (t1) and dynamically determined HDR (like applicant's SL_HDR1 or SL_HDR_2), after the change the first image can be correctly processed because it has its dynamic luminance function co-communicated, in a suitably defined reserved packet, which details will depend on which video communication standard is used (and the video before t1 will normally also be decodable, because the receiver had better determined what the decoding EOTF of that video segment is by the time of that last segment).

But the interesting situation is when a new statically defined HDR or SDR segment starts, because the creator of such video would not have made dynamic metadata, nor would it be easy or guaranteed that the final broadcaster of the combined output video would elegantly solve the problem, so typically there will be situations where the first image does not have sufficient data to decode it. Such data will be received eventually, but that would make the dynamic HDR new decoder behave equally problematic as a HDR10-type HDR decoder.

Such a (static) data package (e.g. DRAM11) would contain typically in practice at least an EOTF, namely the static EOTF with which the lumas of the new segment after the change time (t1) are to be decoded.

The new dynamic HDR decoder is defined to work with a corresponding new HDR encoder, which is to transmit the DRAM11 packet already somewhat in advance, before the change time t1 (that seems a little exotic, as the normal way to implement video is so that video comprises its own metadata, so mixing a segment in from somewhere will have the DRAM packets reside after the change time, which is their logical place). The new HDR decoder will constantly look for such packets, and put them in memory 343 for when suddenly, unexpectedly the dynamic metadata (313) disappears, so that the appropriate EOTF for decoding the image after the change time t1 is available to instantaneously load in the luminance processing sub-branch of the color calculation unit of the dynamic range changing decoder (processor (344)).

In fact, the decoder will have the calculation of the pixel luminances to be displayed corresponding to the lumas received in the consecutive incoming images of the segment calculated by a processor (344) which is arranged to decode the lumas to luminances by using an electro-optical transfer function defined by the information in the last received data package (DRAM).

There can be alternative manners to detect whether a segment change happens, e.g. the decoder may look for some video coding type data in metadata associated with or a header of the incoming images, but it is advantageous to have an embodiment of the HDR video decoder which comprises a video change detector (346) arranged to detect a change of segment by the presence or unavailability of a per image dynamically changeable electro-optical transfer function.

This not only requires less metadata still yielding a robust identification of the segment change issue, but also it can be tightly integrated with the signal processing (e.g. the metadata receiving unit, which normally would parse the data— e.g. load a luminance mapping LUT in the luminance processing sub-branch—would upon finding for a certain image time t1 that there is suddenly no dynamic luminance mapping function such as F_L(t01), immediately load the EOTF from the stored DRAM package in the luminance processor LUT).

Alternatively the video change detector (346) may be arranged to detect the presence of a change of codec indication packet in metadata (in case the encoder co-supplied such packages, which may be so simple to merely indicate the change, e.g. with a binary yes/no), which must then be received synchronously with the first image which is encoded with a changed method a HDR video encoding. This provides an additional robustness, in case other mechanisms of metadata error are expected to occur frequently (various decoder embodiments may also have other mechanisms to analyze, e.g. as additional information regarding the HDR coding situation, what type of image they are receiving, but other embodiments may not).

It is advantageous if the decoder is arranged to store in the memory the last data package (DRAM) received prior to the moment of change (t1), so that the correct EOTF is used.

Embodiments of the video decoder may comprise a video input (342) arranged to receive video communicated on a HDMI or DisplayPort cable, as e.g. HDMI has on its metadata packet definition possibilities to communicate both dynamic per image packets which can contain an image-optimized luminance mapping function F_L(t0), and the static (sparse) packets which can define a fixed EOTF. This HDMI video communication mechanism may introduce its own problems. E.g., even if the incoming stream from the broadcaster being input to a settopbox is relatively well-structured, with a dense co-communication of DRAM packages, upstream the settopbox when the video is outputted to a television good synchronization may be lost because some (e.g. older) version of such a video communication technology does not provide for good synchronization. And a decoder might take a DRAM package and e.g. put it in memory for decoding use at an unspecified moment in time compared to the video stream image number.

Corresponding to the decoder new ability, there is a video encoder (3010) arranged to encode a high dynamic range video consisting of temporally successive images, in which the video is composed of successive time segments (S1, S2) consisting of a number of temporally successive images (I1, I2) which have pixel colors, which pixel colors in different time segments are defined by having lumas corresponding to pixel luminances according to different electro-optical transfer functions, wherein the images in some of the segments are defined according to dynamically changeable electro-optical transfer functions which are transmitted as a separate function for each temporally successive image, and wherein the images in other segments have lumas defined by a fixed electro-optical transfer function, of which the information is co-communicated in data packages (DRAM) which are transmitted less frequently than the image repetition rate, and wherein at least one of said data packages (DRAM) characterizing the electro-optical transfer function of the image pixel lumas after a moment of change (t1) between a first and a second segment is transmitted prior to the moment of change (t1). Such an encoder may be situated at various positions in a typical HDR video communication chain, as long as the end device which contains the new decoder can correctly decode the mixed HDR video (which it receives e.g. over a HDMI cable). So e.g. it may be an encoder of the television signal broadcaster, e.g. the British Broadcasting Corporation, or the encoder may reside in an intermediate video handling device 321 (such as a Settopbox or a computer, or potentially even a memory reading apparatus such as a BD player, etc.), in which case it can correct bad temporally mixed HDR video to decodable mixed video according to the present invention and its embodiments.

Also interesting are a method of video decoding arranged to decode a high dynamic range video consisting of temporally successive images, in which the video is composed of successive time segments (S1, S2) consisting of a number of temporally successive images (I1, I2) which have pixel colors, which pixel colors in different time segments are defined by having lumas corresponding to pixel luminances according to different electro-optical transfer functions, wherein the images in some of the segments are defined according to dynamically changeable electro-optical transfer functions which are transmitted as a separate function for each temporally successive image, and wherein the images in other segments have lumas defined by a fixed electro-optical transfer function, of which the information is co-communicated in data packages (DRAM) which are transmitted less frequently than the image repetition rate, and wherein at least one of said data packages (DRAM) characterizing the electro-optical transfer function of the image pixel lumas after a moment of change (t1) between a first and a second segment is transmitted prior to the moment of change (t1), and wherein the a data package (DRAM) of said data packages received at a moment in time earlier by a number (N) of picture repetition times than the moment of change (t1) is stored, and a method of video encoding arranged to encode a high dynamic range video consisting of temporally successive images, in which the video is composed of successive time segments (S1, S2) consisting of a number of temporally successive images (I1, I2) which have pixel colors, which pixel colors in different time segments are defined by having lumas corresponding to pixel luminances according to different electro-optical transfer functions, wherein the images in some of the segments are defined according to dynamically changeable electro-optical transfer functions which are transmitted as a separate function for each temporally successive image, and wherein the images in other segments have lumas defined by a fixed electro-optical transfer function, of which the information is co-communicated in data packages (DRAM) which are transmitted less frequently than the image repetition rate, and wherein at least one of said data packages (DRAM) characterizing the electro-optical transfer function of the image pixel lumas after a moment of change (t1) between a first and a second segment is transmitted prior to the moment of change (t1).

Depending on the technology, if only one DRAM package is communicated before the moment of change of HDR coding method, it is best if the package is neither sent too close to the change time, nor too early before it. Typically a quarter second, half second, and/or second may be good transmission times, ergo this would e.g. for a 50 Hz video correspond to e.g. 10 frames, 25 frames, or 50 frames before the first frame that is encoded according to the new, static HDR coding method. The below explanation will also detail how the decoder can easily determine to which image time instant such a pre-sent DRAM will belong.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional depending on the various embodiments or uses, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE EMBODIMENTS

Figure 1:
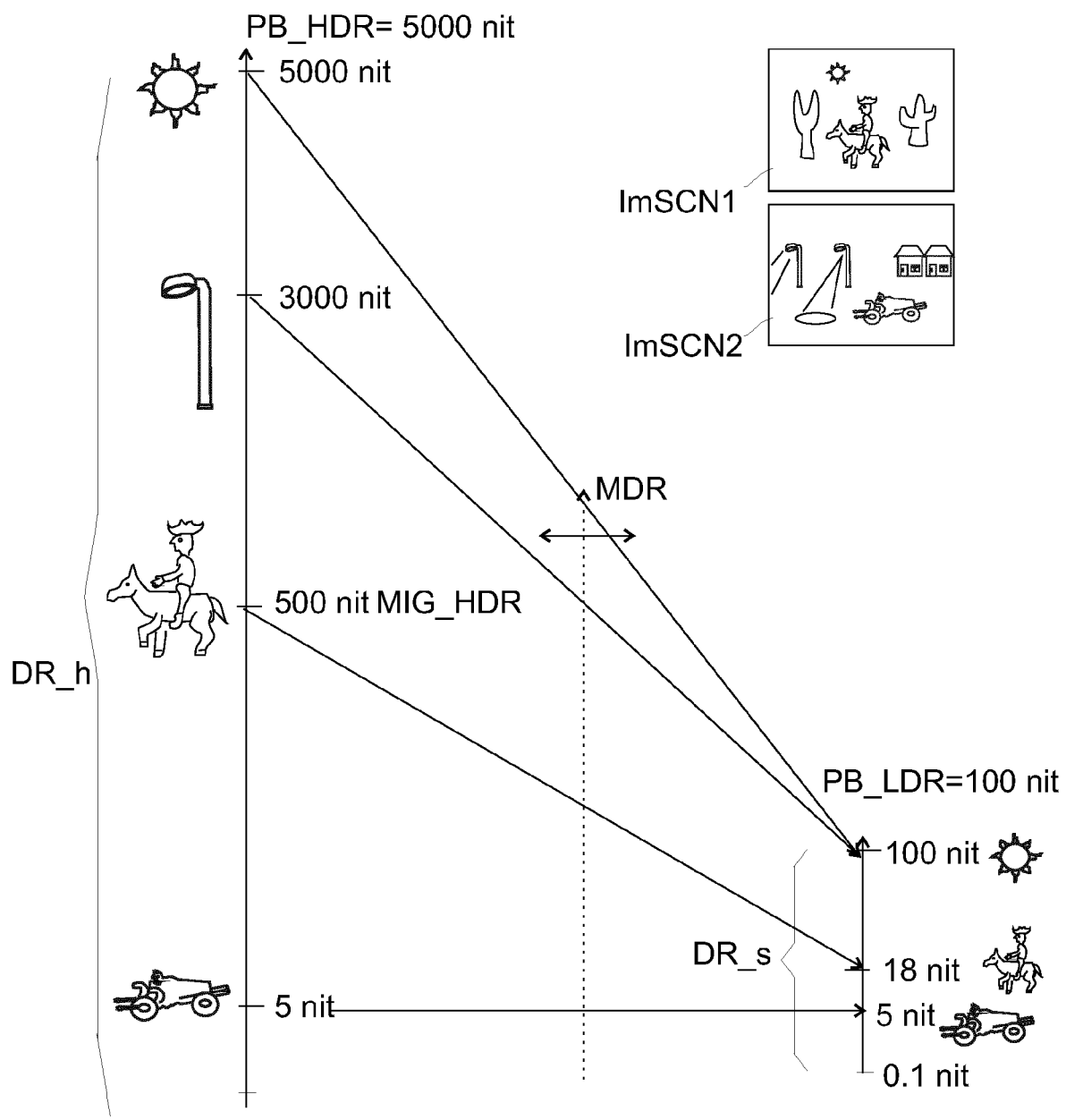
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_h resp. DR_s) low or more precisely standard dynamic range image, which in case of reversibility would also correspond to a mapping of an SDR image coding the HDR scene, to a reconstructed HDR image of that scene.
Figure 2:
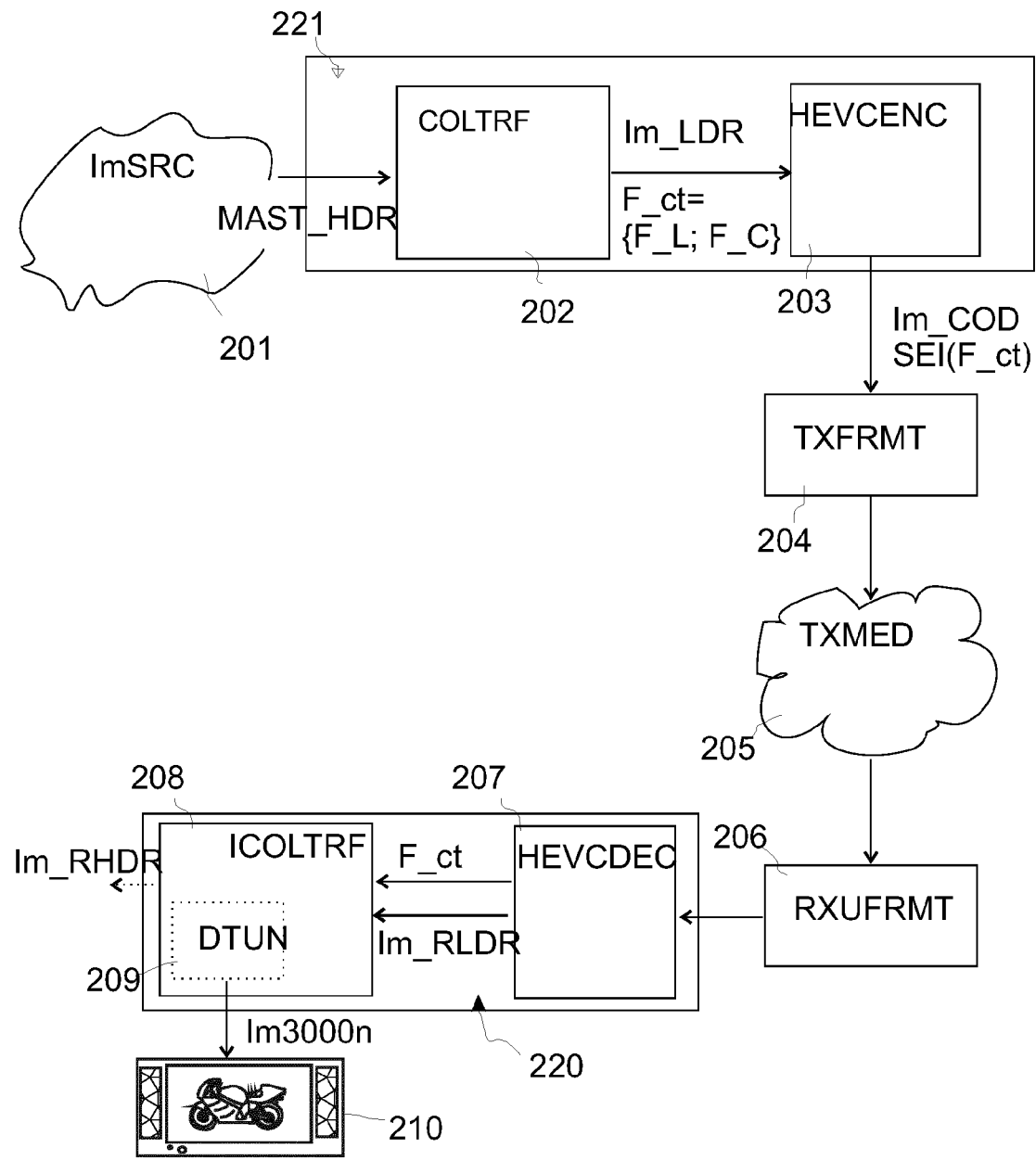
FIG. 2 schematically illustrates an example of a technology to encode high dynamic range images, i.e. images capable of having pixel luminances up to at least 700 nit (i.e. at least 7× the PB_C of the SDR image) typically, or more (in fact currently HDR image typically have a 1000 nit PB_C or more), which can e.g. communicate the HDR image(s) actually as an SDR image plus metadata in e.g. SEI messages encoding color transformation functions comprising at least an appropriate determined luminance transformation F_L for the pixel colors, to be used by the decoder to convert the received SDR image(s) into HDR images(s) which are a faithful reconstruction of the original master HDR image(s) created at the image creation side, and the re-use of typical image communication technologies already developed for SDR communication such as e.g. HEVC encoding.
Figure 3:
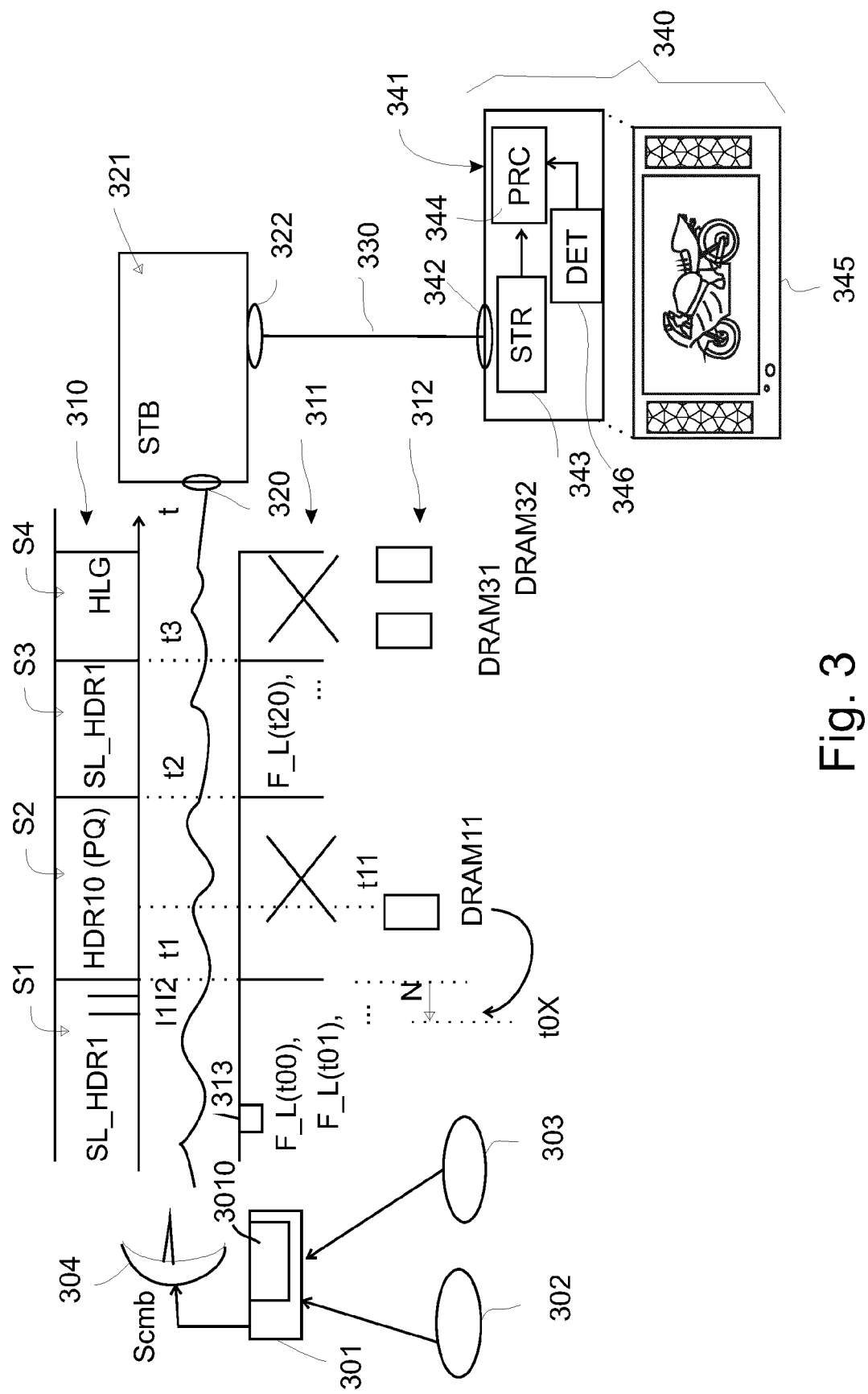
FIG. 3 schematically shows an example of a system according to the present invention with a new decoder 341 and an encoder of temporally mixed video 3010.
Figure 4:
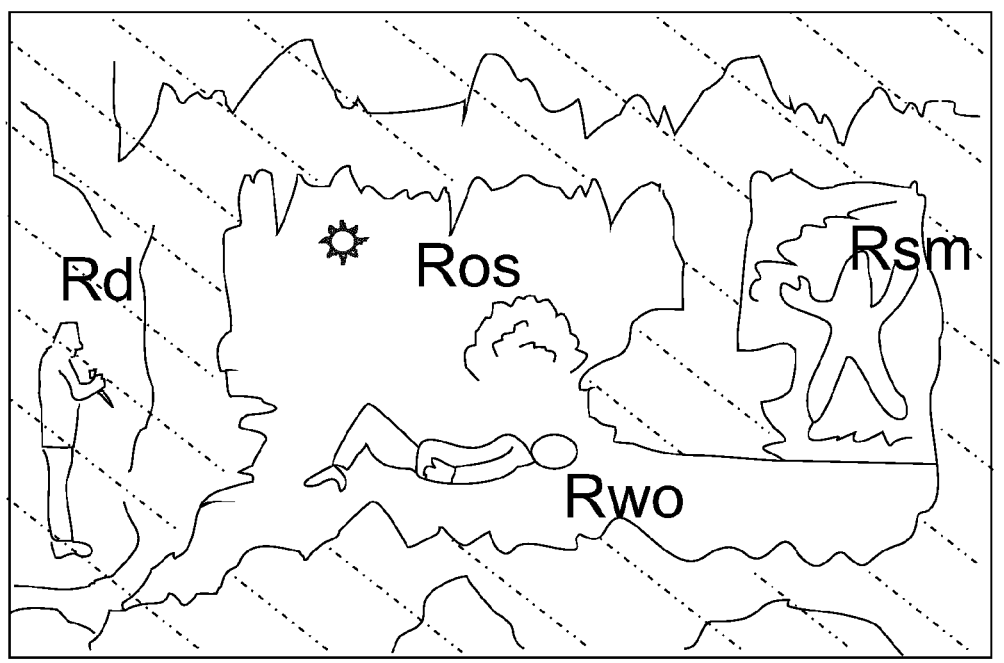
FIG. 4 schematically illustrates what the concept of dynamically changing luminance mapping functions, which in the framework of the present invention corresponds to dynamic EOTFs (and OETFs)
Figure 4:
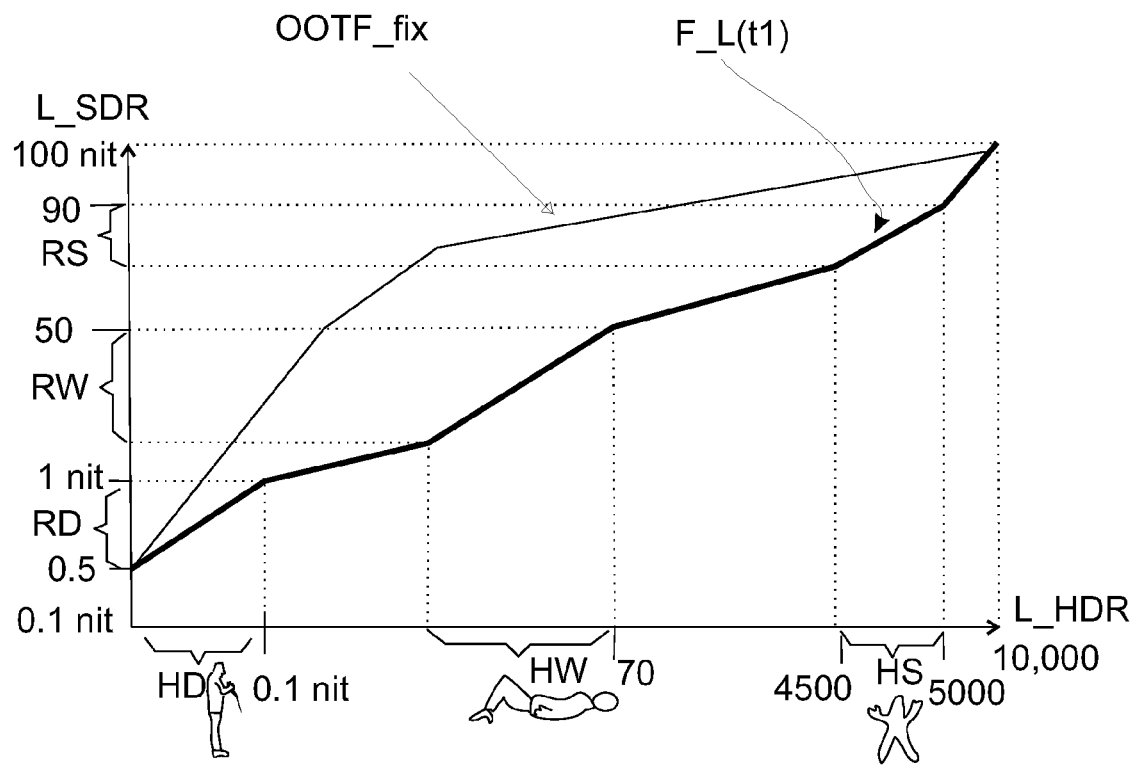

FIG. 3 shows an example of the new HDR codec ecosystem, with a new decoder 314 capable of decoding all the occurring HDR segment coding methods (and also interspersed SDR video). The content creator, or often more precisely re-distributor could of course try to map all incoming video to a common luminance range and transmit this via a single code, but this requires other not necessarily easy techniques, and will not always be done. It may typically be, certainly in the coming years, that e.g. a sports television broadcasting is broadcasting a high quality HDR capturing of an event, but the in between commercials are e.g. in SDR (and the creator of that content may not want or even forbid a conversion to HDR, because he is not comfortable with say what will happen to bright regions which clip in his SDR recording when brightened to HDR regions). Also, not all distribution technology may already be capable of doing actual codec conversions, especially since several new codecs keep popping up with their own philosophy and technical peculiarities (especially expensive professional apparatuses that are less frequently changed than e.g. consumer mobile phones).

As an example of a video distribution apparatus (the reader being able to similarly imagine other embodiments like e.g. internet-based OTT delivery etc.), there is a television broadcaster, who at his premises operates a video mixer 301, which can mix video from a first video source 302 (e.g. a pre-recorded soap coded in HDR10) and a second video source 303 (e.g. locally stored commercials to be aired at this moment in time). The video mixer in its simplest embodiment will just concatenate the various coded segments in time. In principle it is not bad if this happens (as in the SDR era when there were only uniquely defined SDR lumas for all possible videos) in the coded video color space, i.e. the HEVC images of the HDR10 segment are communicated with Y'*CbCr colors with those color components being calculated for the original linear RGB pixel colors according to the PQ OETF as defined in SMPTE ST.2084, and the SDR lumas according to Rec. 709, etc. As said, successively occurring same 10 or 12 bit luma codes may then mean something very different in successive segments as the actual linear RGB color, but if done well, those final RGB colors can be correctly determined by any receiver (and if not done well, then not). The video encoder 3010 may just apply e.g. HEVC compression to all the YCbCr colors of the pixels in all successive images, but if the encoder is to function according to the present invention, it must be careful regarding the generation of the decoding function information, namely the dynamic luminance mapping function metadata packets like packet 313, and the static packets with the appropriate EOTF codification like packet DRAM11, which will in this example communicate the PQ EOTF. The dynamic functions $F\_L(t00)$, $F\_L(t01)$, etc., will—for dynamically coded HDR like the SL_HDR1 segment in the example—be communicated for each respective image I1, I2, etc. The static packets, DRAM11, and a couple of other repetitions typically, may be encoded into the synchronized or synchronizable metadata in various ways, but according to at least one principle to be followed: at least one DRAM11 packet should be inserted in the outgoing stream prior to the change time t1 when the HDR10 encoded video starts, by a number N of image repetition times (e.g. 2 images, or 10 images before, depending on what the system or standard typically does), i.e. at previous time moment t0X. The output of the video encoder, e.g. as transmitted by antenna 304 as combined HDR video signal Scmb, will hence be transmitted as three parts over time: video stream 310 with segments S1 to S4, dynamic metadata stream 311 (if of course transmitting dynamic luminance functions, with the crosses indicating the times where there is no such dynamic metadata), and irregular data packages (DRAM) comprising the information of just one fixed EOTF in second metadata stream 312, e.g. two packets DRAM31 and DRAM32 are shown which characterize the HLG encoded HDR video segment, i.e. which indicate in their metadata a HLG EOTF (the skilled person can understand there are various ways to do this, but typically dynamic functions need to have their shape defined, whereas fixed EOTFs exist only in a couple of flavors, so the DRAM packet may contain merely an EOTF version number, such as 1 means HDR10, 2 means HLG, etc.).

Figure 5:
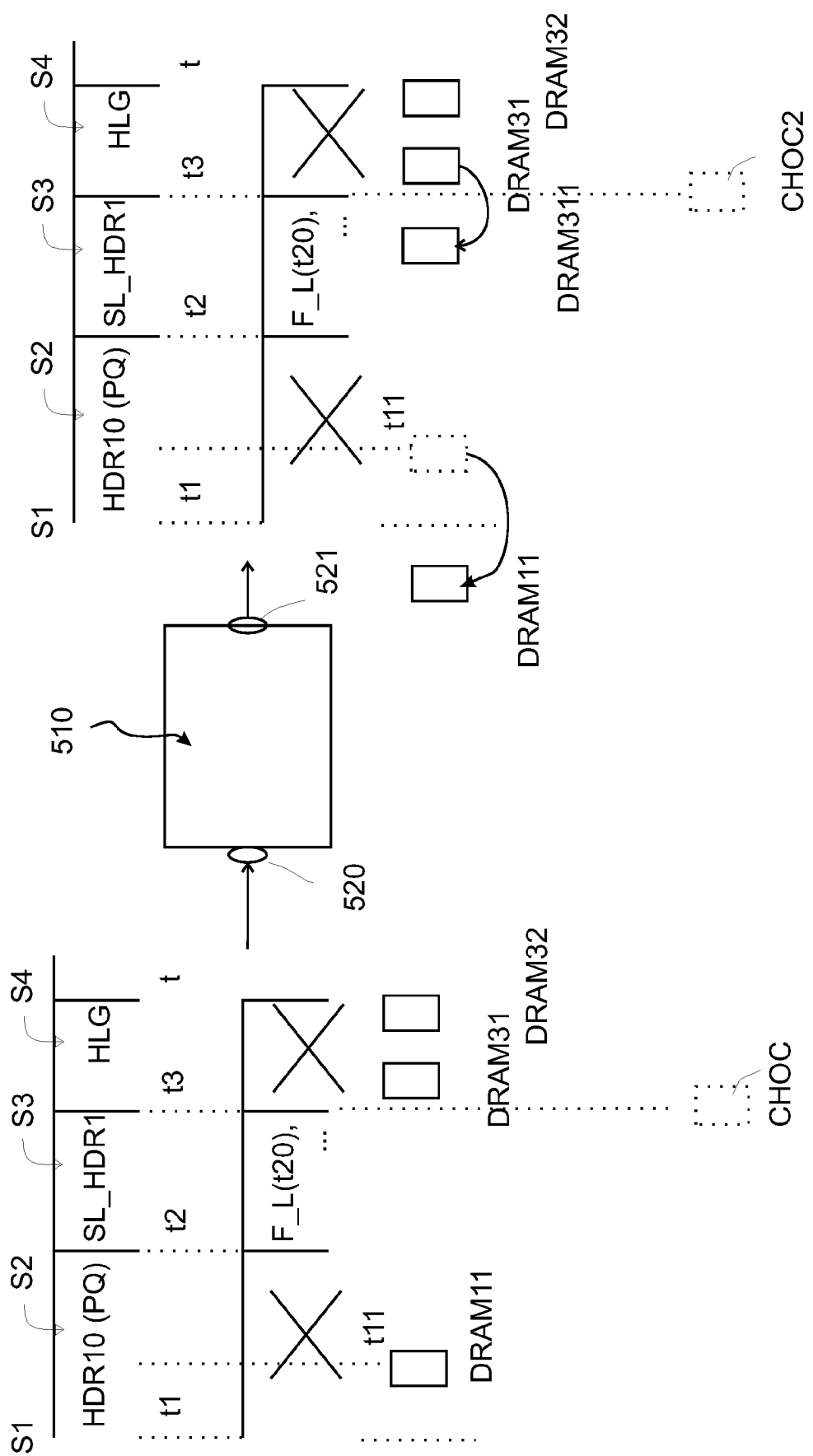
FIG. 5 schematically illustrates an encoder embodiment according to the present invention.

An example of a new video encoder 510 is shown in FIG. 5 (without loss of generality, for following an example the reader may assume it is in a Settopbox and "corrects" an incoming mixed HDR stream before it outputs uncompressed mixed HDR video data via its output 521 over e.g. an HDMI cable (to be clear: uncompressed doesn't mean that the colors cannot be encoded with a color coding different from the standard additive color encoding being linear RGB; it just means that the video going over the HDMI cable is not HEVC or AVC compressed, but the receiver, e.g. a television, may still need to do a color transformation to the appropriate linear RGB colors for driving its display panel 345).

The incoming triple mixed HDR video into input 520 (i.e. the pixellized video image data, and two metadata streams containing the information for correctly decoding the image pixel luma codes, or in general their color codes) is as explained with FIG. 3, but of the incorrect type, because the DRAM11 packet e.g. temporally overlaps with its corresponding HDR10 video data segment S2 (assume the broadcaster just shuffled the video in between each other as it came in, e.g. with a simple switch).

At the output 521 a new HDR mixed video signal is created, which is correct, and two exemplary possibilities are given. Packet DRAM11 is just shifted to a previous communication time instant, meaning it will not be resent at its original position as indicated by the dotted packet after t1. For the HLG a duplication possibility is shown. A copy DRAM311 is communicated out prior to change time t3, but the original DRAM31 packet is also sent, at its original time, since it may be beneficial to duplicate the static packets a couple of times.

Returning to FIG. 3, an exemplary receiving side embodiment is shown. It contains an intermediate video handling device 321 which receives via its input 320 e.g. a satellite broadcast (demodulates etc.), and communicates the demodulated and typically decompressed video via its output 322 to a display system 340, via a video communication link 330, e.g. a HDMI cable, but potentially also a wireless established link, etc. The skilled reader can imagine how another embodiment would work if a non-volatile memory apparatus is substituted for the display system, e.g. if correctly formatted mixed video is stored for later use, etc.

The display system contains a video processing part, which via an input of a video decoder receives the mixed HDR video, and contains a memory 343 for storing at least one of the DRAMs, to be later used by the processor 344 to apply the correct color transformation involving typically a dynamic range transformation e.g. of a video decoding to an image of a different dynamic range than the input image, or a decoding per se from lumas to luminances staying within the same coding i.e. the same dynamic range, e.g. SDR, etc. Such a decoder can handle all the situations in which the decoding still needs information from at least one DRAM packet (even if some information may be dynamic, but not a sufficient amount to do good decoding); we assume for simplicity that dynamic metadata means full information enabling decoding the present incoming image to any MDR image including an SDR and HDR image, and static means needing at least some static information for its decoding, which would be included in the sparsely available and/or non-synchronized DRAM information. Some embodiments may usefully comprise a video change detector (346) of the type which is constructed to detect such a segment change by spotting the disappearance or appearance of dynamic metadata, i.e. typically dynamic luminance mapping functions for successive images.

Alternatively, the decoder may be triggered (or synchronized) when the change to a subsequent new static (i.e. not having all information always synchronous with the incoming images) image codec happens by detecting the presence of a synchroneous new metadata packet, which indicates such a change (in case it is transmitted by a transmitter, which change-of-codec indication packet CHOC is drawn dotted in FIG. 5, because of the optional nature of such improved embodiment). E.g. an embodiment of the video change detector (346) may test either of the unavailability of the dynamic metadata luminance mapping function or the CHOC packet or both, and some embodiments may in addition test other properties of the received video data. If a CHOC packet is already available at its input, any original or intermediate apparatus containing a corresponding embodiment of the present encoder may simply copy it at the same time instant in its output stream as CHOC2 packet, and otherwise it may create such a correctly synchronized CHOC2 packet (output change-of-codec indication packet).

Note that were we teach function for simplicity of understanding, also in some embodiments a set of functions for an image (time instant) can be communicated, which are to be applied concatenatedly, but that doesn't majorly change the essence of our new technology.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A video decoder comprising:
   a memory circuit; and
   a processor circuit,
   wherein the processor circuit is arranged to decode a high dynamic range video,
   wherein the high dynamic range video comprises a plurality of segments,
   wherein the plurality of segments comprises a first segment and a second segment,
   wherein each of the plurality of segments comprises a plurality of images,
   wherein each of the plurality of images comprises a plurality of pixels,
   wherein each of the plurality of pixels comprise pixel colors,
   wherein the pixel colors are defined by lumas,
   wherein the lumas correspond to pixel luminances according to an electro-optical transfer function,
   wherein the pixel luminances in the first segment are defined according to a dynamically changeable electro-optical transfer function,
   wherein the dynamically changeable electro-optical transfer function has a variable function shape,
   wherein the pixel luminances in the second segment are defined according to a fixed electro-optical transfer function,
   wherein the images are received at an image repetition rate,
   wherein the processor circuit is arranged to receive a dynamically changeable electro-optical function for each image of the first segment,
   wherein the processor circuit is arranged to receive at least one data package, wherein the at least one data package comprises the fixed electro-optical transfer function,
   wherein the at least one data package is provided less frequently than the image repetition rate,
   wherein the receiving of the at least one data packages is at a receive time,
   wherein the receive time is before a moment of change,
   wherein the moment of change is the moment between receiving the last image of the first segment and the first image of the second segment;
   wherein the processor circuit is arranged to store the at least one data package in the memory circuit;
   wherein the processor circuit is arranged to detect the moment of change; and
   wherein the processor circuit is arranged to apply the stored fixed electro-optical transfer function to the images of the second segment.

2. The video decoder as claimed in claim 1, further comprising a change detector circuit, wherein the change detector circuit is arranged to detect a change of segment by the presence or absence of a per image dynamically changeable electro-optical transfer function.

3. The video decoder as claimed in claim 1, further comprising a change detector,
   wherein the change detector circuit is arranged to detect the presence of a change of a codec indication packet in metadata,
   wherein the codec indication is received synchronously with the first image of one of the plurality of the segments,
   wherein the first image has a different method of a HDR video encoding than an image received prior to the first image.

4. The video decoder as claimed in claim 1,
   wherein the calculation of the pixel luminances corresponding to the lumas received in the consecutive incoming images of the second segment,
   wherein the calculation uses an electro-optical transfer function defined by the information in a last received data package.

5. The video decoder as claimed in claim 1, further comprising an input circuit, wherein the input circuit is arranged to receive video communicated on a HDMI or a DisplayPort cable.

6. The video encoder as claimed in claim 1,
wherein the calculation of the pixel luminances corresponding to the lumas received in the consecutive incoming images of the second segment,
wherein the calculation uses an electro-optical transfer function defined by the information in a last received data package.

7. A video encoder comprising:
a memory circuit; and
a processor circuit,
wherein the processor circuit arranged to encode a high dynamic range video,
wherein the high dynamic range video comprises a plurality of segments,
wherein the plurality of segments comprises a first segment and a second segment,
wherein each of the plurality of segments comprises a plurality of images,
wherein each of the plurality of images comprises a plurality of pixels,
wherein each of the plurality of pixels comprise pixel colors,
wherein the pixel colors pixel colors are defined by lumas,
wherein the lumas correspond to pixel luminances according to an electro-optical transfer function,
wherein the pixel luminances in the first segment are defined according to a dynamically changeable electro-optical transfer function,
wherein the dynamically changeable electro-optical transfer function has a variable function shape,
wherein the pixel luminances in the second segment are defined according to a fixed electro-optical transfer function,
wherein the images are received at an image repetition rate,
wherein the processor circuit is arranged to provide a dynamically changeable electro-optical function for each image of the first segment,
wherein the processor circuit is arranged to provide at least one data package, wherein the at least one data package comprises the fixed electro-optical transfer function,
wherein the at least one data package is transmitted less frequently than the image repetition rate,
wherein the transmitting of the at least one data packages is at a transmit time
wherein the transmit time is before a moment of change,
wherein the moment of change is the moment between transmitting the last image of the first segment and the first image of the second segment;
wherein the processor circuit is arranged to store the at least one data package in the memory circuit;
wherein the processor circuit is arranged to detect the moment of change; and
wherein the processor circuit is arranged to transmit the stored fixed electro-optical transfer function to the images of the second segment.

8. The video encoder as claimed in claim 7, further comprising a change detector circuit, wherein the change detector circuit is arranged to detect a change of segment by the presence or absence of a per image dynamically changeable electro-optical transfer function.

9. The video encoder as claimed in claim 7,
wherein the change detector is arranged to detect the presence of a change of a codec indication packet in metadata,
wherein the codec indication is transmitted synchronously with the first image of one of the plurality of segments,
wherein the first image has a different method of a HDR video encoding than an image received prior to the first image.

10. The video encoder as claimed in claim 7, further comprising an output circuit, wherein the output circuit is arranged to receive video communicated on a HDMI or a DisplayPort cable.

11. A method of video decoding comprising:
receiving a high dynamic range video,
wherein the high dynamic range video comprises a plurality of segments,
wherein the plurality of segments comprises a first segment and a second segment,
wherein each of the plurality of segments comprises a plurality of images,
wherein each of the plurality of images comprises a plurality of pixels,
wherein each of the plurality of pixels comprise pixel colors,
wherein the pixel colors are defined by lumas,
wherein the lumas correspond to pixel luminances according to an electro-optical transfer function,
wherein the pixel luminances in the first segment are defined according to a dynamically changeable electro-optical transfer function,
wherein the dynamically changeable electro-optical transfer function has a variable function shape,
wherein the pixel luminances in the second segment are defined according to a fixed electro-optical transfer function,
wherein the images are received at an image repetition rate;
receiving a dynamically changeable electro-optical function for each image of the first segment;
receiving at least one data package, wherein the at least one data package comprises the fixed electro-optical transfer function,
wherein the at least one data package is provided less frequently than the image repetition rate,
wherein the receiving of the at least one data packages is at a receive time,
wherein the receive time is before a moment of change,
wherein the moment of change is the moment between receiving the last image of the first segment and the first image of the second segment;
storing the at least one data package in a memory;
detecting the moment of change; and
applying the stored fixed electro-optical transfer function to the images of the second segment.

12. The method as claimed in claim 11, further comprising detecting a change of segment by the presence or absence of a per image dynamically changeable electro-optical transfer function.

13. The method as claimed in claim 11, further comprising, detecting the presence of a change of a codec indication packet in metadata,
wherein the codec indication is received synchronously with a first image of one of the plurality of segments, wherein the first image has a different method of a HDR video encoding than an image received prior to the first image.

14. The method as claimed in claim 11,
wherein the calculation of the pixel luminances corresponding to the lumas received in the consecutive incoming images of the second segment,
wherein the calculation uses an electro-optical transfer function defined by the information in a last received data package.

15. The method as claimed in claim 11, wherein the video communicated on a HDMI or a DisplayPort cable.

16. A method of video encoding comprising:
providing a high dynamic range video,
wherein the high dynamic range video comprises a plurality of segments,
    wherein the plurality of segments comprise a first segment and a second segment,
    wherein each of the plurality of segments comprise a plurality of images,
    wherein each of the plurality of images comprise a plurality of pixels,
    wherein each of the plurality of pixels comprise pixel colors,
    wherein the pixel colors are defined by lumas,
    wherein the lumas correspond to pixel luminances according to an electro-optical transfer function,
    wherein the pixel luminances in the first segment are defined according to a dynamically changeable electro-optical transfer function,
    wherein the dynamically changeable electro-optical transfer function has a variable function shape,
    wherein the pixel luminances in the second segment are defined according to a fixed electro-optical transfer function,
    wherein the images are provided at an image repetition rate;
providing a dynamically changeable electro-optical function for each image of the first segment; and
providing at least one data package, wherein the at least one data package comprises the fixed electro-optical transfer function,
    wherein the at least one data package is provided less frequently than the image repetition rate,
    wherein the providing of the at least one at least one of the at least one data package is at a transmit time,
    wherein the transmit time is before a moment of change,
    wherein the moment of change is the moment between providing the last image of the first segment and the first image of the second segment.

17. The method as claimed in claim 16, further comprising detecting a change of segment by the presence or absence of a per image dynamically changeable electro-optical transfer function.

18. The method as claimed in claim 16, further comprising, detecting the presence of a change of a codec indication packet in metadata,
wherein the codec indication is received synchronously with a first image of one of the plurality of segments,
wherein the first image has a different method of a HDR video encoding than an image received prior to the first image.

19. The method as claimed in claim 16,
wherein the calculation of the pixel luminances corresponding to the lumas received in the consecutive incoming images of the second segment,
wherein the calculation uses an electro-optical transfer function defined by the information in a last received data package.

* * * * *